United States Patent Office 2,795,591
Patented June 11, 1957

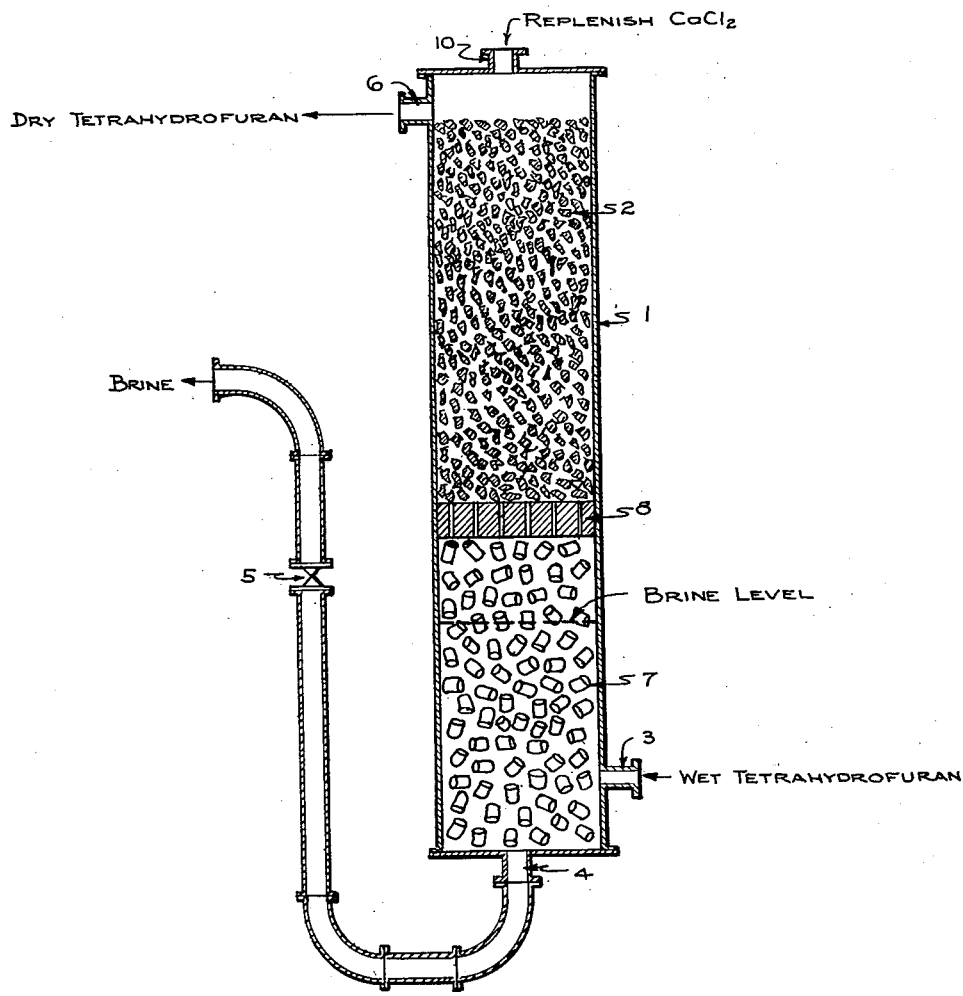

2,795,591

COMPOUND AND PROCESS FOR DRYING TETRAHYDROFURAN

Paul F. Bente, Jr., Lewiston, N. Y., assignor to E. I. du Pont de Nemours and Company, Wilmington, Del., a corporation of Delaware Application February 25, 1953, Serial No. 338,872

2 Claims. (Cl. 260—346.1)

This invention relates to the drying of organic solvents and more particularly to a process and a novel composition of matter for driving tetrahydrofuran.

In recent years tetrahydrofuran has been developed into a valuable industrial solvent used, for example, in the formulation of adhesives and printing inks and also in laying down organic films and coatings. Some of these applications require actual volatilization of the solvent while all may dissipate part of the material through accidental vaporization.

To prevent undue wastage of the solvent, the vapors formed when operations are carried out with exposure to air may be recovered as by the method claimed in my co-pending application, Serial No. 338,871, filed of even date herewith. In this co-pending application it is shown that recovery can be accomplished by adsorption of the vapors on charcoal which contains some iron followed by desorption with steam. On distillation, the steam condensate yields an azeotrope containing about 5.3% by weight of water and boiling at 63.4–63.8° C. The components of the azeotrope of course cannot be separated by simple fractionation alone.

The general object of this invention is therefore to develop a method for drying mixtures of tetrahydrofuran and water.

A particular object of the invention is development of a process specifically suitable for drying the tetrahydrofuran-water azeotrope.

Another object is provision of a method for utilizing the cheap chemical calcium chloride as a drying agent for tetrahydrofuran.

Further objects will be evident from the remainder of the specification and from the drawing which shows:

A vertical section of a drying column useful in carrying out the process of this invention.

Among the best known drying agents is the common inorganic compound calcium chloride. So great is the affinity of the anhydrous chloride for water that it deliquesces upon exposure to the atmosphere. This avidity for water renders the compound especially desirable for the desiccation of both gases and liquids. Many organic solvents contaminated with a small amount of water can readily be dried by percolation through a bed of an hydrous calcium chloride. This procedure is, however, not effective with wet tetrahydrofuran because of a vigorous reaction, accompanied by volume expansion and the evolution of heat, which results when calcium chloride contacts the wet solvent. Because of this expansion it is impossible to pass wet tetrahydrofuran, or even the dry material for that matter, through a bed of calcium chloride. The liquid will not penetrate more than a few inches into such a bed before it cements the bed shut.

Although calcium chloride itself cannot be used in drying tetrahydrofuran, it has been found that the reaction between tetrahydrofuran and calcium chloride produces a complex compound which is suitable for quietly drying the wet solvent. This complex varies somewhat in composition depending on the amount of water present in the tetrahydrofuran and calcium chloride initially used but the formula may be written generally as $$3THF \cdot 2CaCl_2 \cdot xH_2O$$

where THF stands for tetrahydrofuran and $x$ is a number between about 0 and 2. The lower values of $x$ are obtained when anhydrous tetrahydrofuran and calcium chloride are mixed. The value of 2 is obtained when the chloride contacts the tetrahydrofuran-water azeotrope. If $x$ rises much above 2, the compound begins to dissolve in the water it contains. Generally there is enough moisture present in commercial dry chemicals to yield a material in which $x$ varies between about 0.50 and 1. Since the literature seems to report no complexes of tetrahydrofuran and calcium chloride, the compound identified above represents a new composition of matter. The following example illustrates in more detail the preparation and composition of the new compound.

EXAMPLE

A series of preparations was made by reacting substantially anhydrous tetrahydrofuran with anhydrous calcium chloride. The chloride was dried for several hours at 105° C. before use. The compositions of the resultant compounds are summarized in the following table.

Table.—Formation of tetrahydrofuran-calcium chloride complex

| Run | Reactants | | | Method of Analysis [1] | Product, Mole Ratio |
|---|---|---|---|---|---|
| | Moles THF | Moles CaCl₂ | Moles H₂O | | THF:CaCl₂:H₂O |
| 1 | 5.8 | 0.96 | [2] 0.24 | THF Recovery<br>Chlorine (Av. of Four Determinations)<br>Volatiles [3] | 1.51:1.0:0.27<br><br>1.44:1.0:0.30<br>1.33:1.0:0.27 |
| 2 | 2.0 | 0.96 | 0.30 | THF Recovery | 1.64:1.0:— |
| 3 | 3.88 | 0.96 | 0.87 | THF Recovery<br>Volatiles | 1.53:1.0:0.9<br>1.50:1.0:0.9 |
| 4 | 2.6 | 1.3 | 0.31 | Volatiles | 1.57:1.0:1.2 |

[1] In addition to Karl Fischer titrations.
[2] From the dried CaCl₂.
[3] THF plus H₂O.

It will be seen that the formula of the compound is as shown above, $3THF \cdot 2CaCl_2 \cdot xH_2O$, where $x$ varies between about 0.50, 0.25 and 2. Other experiments have shown that $x$ can approach either 0 or 2 in value.

The complex compound is physically a white solid stable so long as it is not overly exposed to moisture. In moist air the solid deliquesces and eventually forms a two-phase system consisting of two liquid layers. The upper layer is tetrahydrofuran containing less than about 0.5% water while the lower layer is a heavy calcium chloride brine. This behavior of the complex makes it an excellent dehydrating agent for tetrahydrofuran and particularly for the aqueous tetrahydrofuran azeotrope.

The tetrahydrofuran-calcium chloride complex may be used to dry tetrahydrofuran in any convenient manner. It may for example merely be powdered and stirred into the wet solvent. If sufficient moisture is present, the two-layer separation noted above begins to take place with the water and salt concentrated in the lower layer and dried tetrahydrofuran in the upper. For best results enough of the complex should be employed to remove most of the water from the tetrahydrofuran and yet leave some of the agent in the solid form after the dehydration.

A preferred method of employing the complex in the dehydration of tetrahydrofuran is illustrated by the drawing which shows a cylindrical drying column 1 containing a bed of the complex. An inlet arm 3, desirably at some distance above the bottom of the column, a lower outlet 4 controlled by valve 5 and an upper outlet 6 are provided and may be kept open by means of appropriate packing such as small cylinders 7 located at the bottom of the column and the perforated plates 8 placed on top of the rings. Porous plugs consisting for example of screens (not shown) may additionally be employed at each inlet or outlet and on top of the perforated plate. In practice, wet tetrahydrofuran is passed into the column through inlet 3 and contacted with the dehydrating agent. When the column becomes filled with liquid, dried tetrahydrofuran rises to the top and may be drawn off continuously through the upper outlet. Heavy calcium chloride brine almost free from tetrahydrofuran may be taken out simultaneously through the bottom outlet 4. The brine level is preferably kept slightly below the perforated plate 8 as is indicated by the dotted line marked "Brine level." The column may be constructed of any convenient material. Glass for example may readily be substituted for the metal shown.

It will be readily understood that the tetrahydrofuran-calcium chloride used in column 1 should contain a minimum of water. Consequently a complex substantially of the formula $3THF \cdot 2CaCl_2$ is desired. The presence of such a complex can be insured by replacing the compound as it is lost through the brine by addition of anhydrous calcium chloride to the dry tetrahydrofuran through inlet 10. The reaction between the chloride and the dried organic compound is not vigorous enough to give trouble if the calcium chloride is added gradually. Expansion of the drying agent takes place before the agent becomes part of the bed and likewise gives no trouble.

Having now described my invention, I claim:

1. The method of dehydrating the tetrahydrofuran-water azeotrope which comprises contacting said azeotrope with the solid addition product of calcium chloride, tetrahydrofuran and water having the formula $$3THF \cdot 2CaCl_2 \cdot xH_2O$$

where TRF represents tetrahydrofuran and $x$ possesses a value between about 0.5 and 2.

2. The method of drying tetrahydrofuran which comprises stirring thereinto a pulverized mass of the tetrahydrofuran addition product of claim 1.

References Cited in the file of this patent

UNITED STATES PATENTS

| | | |
|---|---|---|
| 2,251,292 | Reppe | Aug. 5, 1941 |
| 2,251,895 | Reppe | Aug. 5, 1941 |
| 2,595,544 | Rodman | May 6, 1952 |

FOREIGN PATENTS

| | | |
|---|---|---|
| 508,548 | Great Britain | July 30, 1939 |
| 696,779 | Germany | Sept. 28, 1940 |
| 700,036 | Germany | Dec. 11, 1940 |

OTHER REFERENCES

Pfeiffer: "Organische Molekulverbindungen," Enke, Stuttgart (1927), pp. 51–58.

Greenbaum: J. Am. Pharm. Assn. 18, 784 (1929).